United States Patent [19]

Wick et al.

[11] 3,737,574

[45] June 5, 1973

[54] SYSTEM FOR REPRODUCING COLOR IMAGES

[75] Inventors: Richard Wick, Munich; Friedrich Bestenremer, Grunwald; Reinhold Deml; Josef Helmberger, both of Munich, all of Germany

[73] Assignee: Agfa-Gevaert Aktiengesellschaft, Leverkusen, Germany

[22] Filed: July 14, 1971

[21] Appl. No.: 162,341

[30] Foreign Application Priority Data

July 18, 1970 Germany....................P 20 35 821.8

[52] U.S. Cl. ..............................................178/5.2 R

[51] Int. Cl. ..............................................H04n 9/02

[58] Field of Search .................178/5.2, 5.2 D, 5.4 R, 178/5.4 ST, 6.7 A; 350/162 SF

[56] References Cited

UNITED STATES PATENTS 3,483,315 12/1969 McMann, Jr....................178/5.4 ST
3,507,981 4/1970 Eilenberger......................178/5.4 ST
3,535,992 10/1970 Golomark et al..................178/5.2 D
3,549,237 12/1970 Bouche et al. ..................350/162 SF
3,591,268 7/1971 Neale ...............................178/5.2 D

*Primary Examiner*—Richard Murray
*Attorney*—Michael S. Striker

[57] ABSTRACT

Frames on a color motion picture film are scanned point-by-point along scanning lines for reproduction on a color television receiver. The modulated light beam resulting from the scan is expanded optically to extend across three filter strips of red, green, and blue, respectively. At least two of the filter strips have grating lines running perpendicular to the direction of the scanning lines, the distance between grating lines on the first filter strip differing from the distance between grating lines on the second filter strip. A single photoelectric transducer means receive the signals from all filter strips. The output of the photoelectric transducer is converted into a standard television signal for reproduction on a television receiver.

22 Claims, 6 Drawing Figures

INVENTOR
Dr. RICHARD WICK
Dr. FRIEDRICH BESTENREINER
BY Dr. REINHOLD DEML
Dr. JOSEF HELMBERGER

INVENTOR
Dr. RICHARD WICK
Dr. FRIEDRICH BESTENREINER
BY Dr. REINHOLD DEML
Dr. JOSEF HELMBERGER

*[signature]*
Attorney

SYSTEM FOR REPRODUCING COLOR IMAGES

CROSS REFERENCE TO RELATED APPLICATIONS

The invention disclosed herein is preferably used in conjunction with the system and method disclosed in our copending application entitled "Method And Arrangement For Scanning A Sequence Of Images" filed simultaneously herewith, and having Ser. No. 162,373.

BACKGROUND OF THE INVENTION

The present invention relates to a system for televising colored scenes, and more particularly to improvements in a system for instantaneous television viewing of motion picture color films. Still more particularly, the invention relates to improvements in a system wherein successive frames of motion picture color film are scanned to produce signals for reproduction of images on the screen of a color television receiver.

It is already known to transport motion picture color film in stepwise fashion and to scan each successive film frame line-by-line along its full height. The originally white beam of scanning light is colored as it passes through the scanned film frame and is broken up into its color components by resorting to a dichroic beam splitter. Each component of the beam is caused to impinge upon a separate photoelectric transducer, such as a secondary electron multiplier, and the transducers are connected with a circuit whose output furnishes a color television signal in accordance with required standards or norms. A drawback of such color television systems is that they must employ a highly complicated transporting device for motion picture film in order to insure sufficiently long intervals of dwell between successive stepwise advances and also that the use of three transducers and of dichroic beam splitters, contributes excessively to the initial and maintenance cost of the system. Furthermore, different aging of the transducers brings about undesirable shifting of color values and a distortion of the reproduced images.

A method and arrangement for continuously transporting the film during the scanning process, rather than the known stepwise arrangement, is described in detail in the above-identified copending application. This information will not be repeated herein. Where the presently disclosed method and arrangement for televising color film differs slightly depending upon which type of film transport is used, such differences will be clearly set forth

SUMMARY OF THE INVENTION

An object of the invention is to provide a color television system for reproduction of images on frames of motion picture color film or the like wherein the number of complicated and expensive components is less than in presently known systems.

Another object of the invention is to provide a color television system wherein the numer of photoelectric transducers (such as secondary electron multipliers) is less than the number of primary colors.

A further object of the invention is to provide novel and improved means for evaluating the light beam which scans the frames of motion picture color film for the purpose of reproducing the images of such frames on the screen of a color television set.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figures 1, 2, 3, 4:
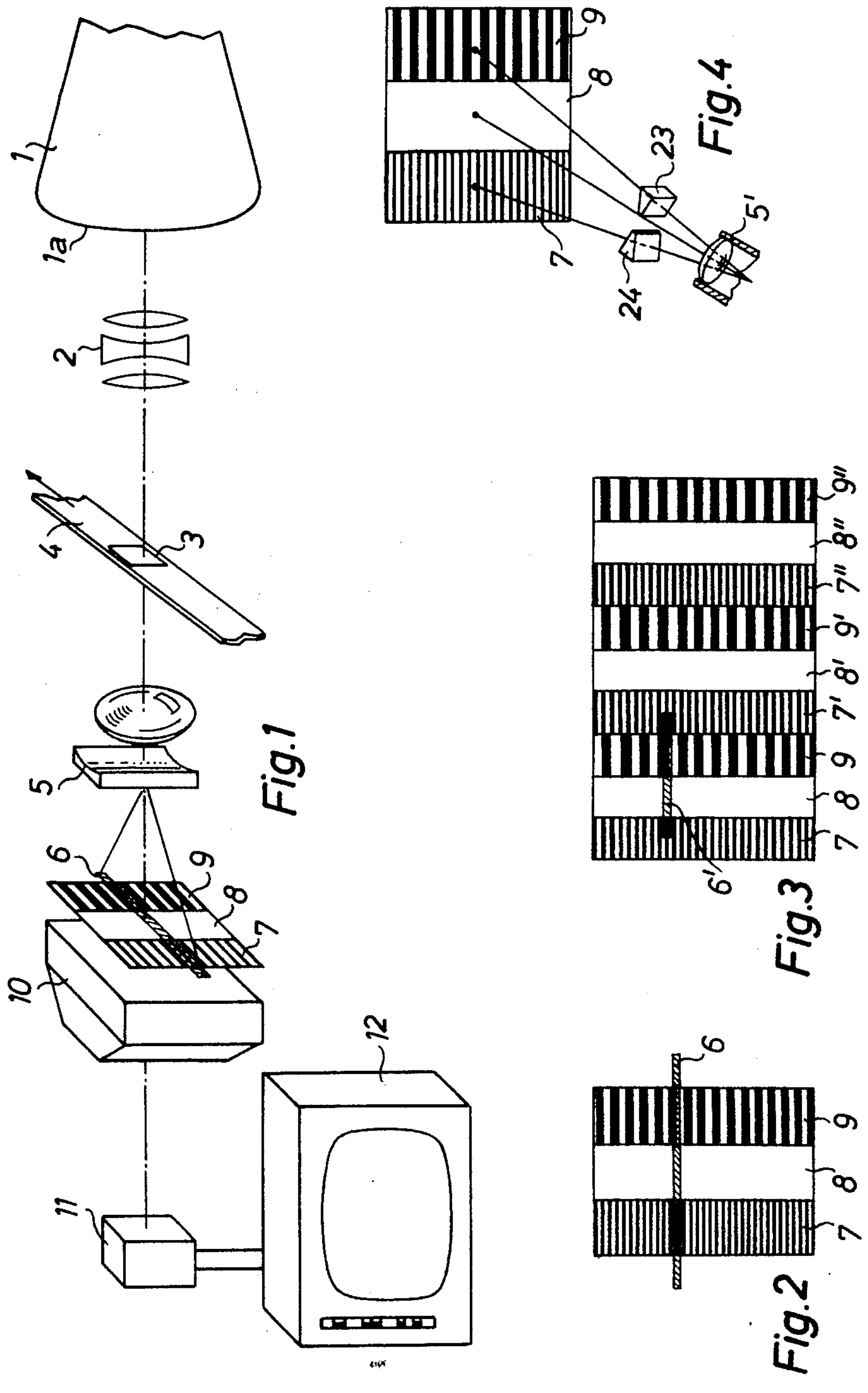
FIG. 1 is a fragmentary diagrammatic perspective view of a color image reproducing system which embodies one form of the invention.
FIG. 2 is a front elevational view of the composite filter shown in FIG. 1.
FIG. 3 is a front elevational view of a modified composite filter.
FIG. 4 is a fragmentary perspective view of a modified system.

Referring first to FIG. 1, there is shown a scanning tube 1 having a screen 1a and capable of producing on the screen a point source of substantially white light which travels, line-by-line, at a high speed across the screen. The scanning can take place at 625 lines per frame (television frame) as is customary in commercial color and black-and-white television systems. To avoid confusion between the "frame" of the film and the "frame" as used in television, the latter will be designated "t.v. frame" herein. The term "field" as used herein will be reserved for its standard television use, i.e. two fields constitute a t.v. frame. The dimensions of the screen 1*a* are selected in such a way that the travelling light point travels over a total area which is slightly greater than the area of a frame 3 on motion picture color film 4. The film 4 is illuminated by way of an objective lens system 2 and can be transported in stepwise fashion as is customary in presently known cinematographic apparatus. That film frame which registers with the objective lens system 2 is then scanned three times during each interval between successive stepwise advances of the film 4. This insures a satisfactory transition from the customary rate of film transport of about 18 frames per second to the rate of 60 fields per second as is cutomary in color television systems in the U.S.; the same is true of other known television systems wherein a rate of 50 fields per second is used.

However, it is simpler to transport the film 4 continuously at such a speed that the film is advanced by the length of a frame druing each 3/60 of a second, as is disclosed in the above-identified copending application. In this case, the scanning region must be moved in the direction of film advance and in synchronism therewith, following completion of the first and second scan of a frame. Details of such a system and the requirements of overall scanning area associated therewith are, as stated above, furnished in our copending application.

The light beam issuing from the scanning tube 1 is modulated by the contents of the scanned film frame 3 and is thereupon expanded by an astigmatic lens 5, e.g., a cylindrical lens, so that it forms an expanded linear beam 6. Since the refracting power of the lens 5 in the vertical direction is zero, the height of the beam 6 corresponds substantially to the diameter of the scanning beam. The beam 6 impinges on a composite filter which includes three strips 7,8 and 9. This compositie filter is located in front of a single photoelectric transducer, such as a secondary electron multipler 10. Suitable light conducting and mixing means are provided to insure that all portions of the composite filter including the strips 7, 8 and 9 exert the same influence on the output signal of the transducer 10. The strip 7 constitutes an additive red filter, the strip 8 is a green filter and the strip 9 is a blue filter. The two outer strips 7, 9 are provided with superimposed gratings consisting of opaque lines perpendicular to the filter strips, i.e. horizontal in FIG. 1. These can be imprinted on the respective strips, e.g., in black color. The lines of the gratings which are superimposed on the strips 7 and 9 are thus parallel to the expanded beam 6. The width of the transparent portions of the strips 7 and 9 preferably equals or approximates the width of the opaque lines of the respective gratings. The ratio of frequency of the grating on the strip 7 to the frequency of the grating on the strip 9 is not an integral multiple. The width of opaque lines of gratings on the strips 7 and 9 can be in the order of 1/100 millimeter.

When the tube 1 scans the illustrated film frame 3 and the beam 6 travels along the strips 7–9 of the composite filter while the scanning beam travels along a particular line of the screen 1a which line is parallel to the strips 7 and 9, a function is superimposed on the color signal in the particular color. Such a function varies between the values of zero and plus one at a determined frequency. Since the beam 6 has a finite width, one can obtain a substantially sinusoidal signal shape even if the gratings on the strips 7 and 9 have sharply defined edges.

Transducer 10 furnishes an output signal which combines determined ratios of the green color signal (having no carrier), the blue color signal (having a first carrier frequency) and the red color signal (having a second carrier frequency). A circuit 11 which receives output signals from the transducer 10 is provided wth conventional frequency filters and converts the output signal from the transducer 10 into a luminance signal and into a chrominace signals. The luminance signal determines the brightness of the televised color image and the chrominance signal determines the color value of a particular point of the image on the screen of the color television receiver 12. Such signal renders it possible to reproduce the image of the film frane on the screen of the receiver 12. Suitable circuit arrangements for block 11 may be found in the article "A Single-Vidicon Television Camera System" by Lewis Briel, April 1970, Vol. 79 of the Journal of the Society of Motion Picture and Television Engineers; specifically in FIGS. 5 and 7A.

FIG. 2 shows again the composite filter consisting of strips 7, 8 and 9, and the expanded light beam 6. The length of the light beam 6 with reference to the combined width of the strips 7–9 is selected in such a way that it exceeds the combined width by a distance corresponding to the extent to which the beam 6 is shifted in the film transport direction for the sequential scannings of a film frame when the continuous film transport method is used rather than the stepwise method. (See above-identified copending application). This insures that, during each stage of the scanning of a film frame 3, all three strips 7–9 of the composite filter are fully covered by the expanded beam 6. The configuration of the cylinder lens 5 is such that the brightness of the expanded beam 6 is constant from end to end.

FIG. 3 illustrates a modified composite filter which comprises several red filter strips 7,7′,7″, several green filter strips 8,8′,8″ and several blue filter strips 9,9′,9″. The filter strips 7–9″ are of identical width and are arranged in a predetermined sequence, i.e., two neighboring filter strips of one color (such as 7 and 7′ or 7′ and 7″) are separated from each other by two filter strips of the other two colors (such as the filter strips 8,9 or 8′,9′) always arranged in the same order. The length of the expanded beam 6′ is exactly 3 times the width of a single filter strip; this insures that the beam 6′ invariably covers a full red filter strip, a full green filter strip and a full blue filter strip (even through such full filter strip may consist of two sections). In the illustrated position of the beam 6′ the latter fully overlaps the strips 8,9 and portion of filter strips 7,7′ which add up to a full filter strip 7 or 7′. The arrangement of filter strips of FIG. 3 thus insures that equal areas of all filter strips are covered by the beam.

FIG. 4 illustrates a portion of a modified apparatus. The cylindrical lens 5 is replaced with beam splitters in the form of prisms 23,24 or partially transmissive mirrors, which cooperate with an objective lens 5′ to image each scanned point of a film frame on each of the three filter strips 7, 8 and 9. The width of the filter strips 7–9 is selected in such a way that the images of the scanned point cannot stray beyond the respective filter strip during scanning of a film frame. The width of the strips 7–9 at least equals the extent of vertical deflection of the scanning beam which deflection in turn depends on the height of the film frame.

Figure 5:
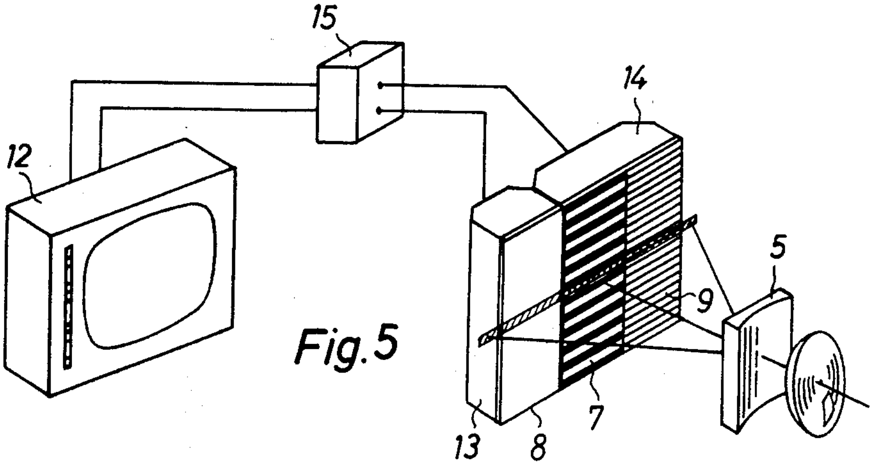
FIG. 5 is a perspective view of a portion of a further system.

Referring to FIG. 5, there is shown a system which includes the scanning tube 1 and objective lens system 2 (not shown) as well as the cylindrical lens 5 and filter strips 7,8,9 of FIG. 1. However, the green filter strip 8 (which is without a grating) is not placed between the red and blue strips, but is placed at one end. The transducer means comprises a first secondary electron multiplier 13 behind the filter strip 8 and a second secondary electron multiplier 14 behind the filter strips 7 and 9. The operation is substantially the same as that of the system shown in FIG. 1; however, the control circuit 15 receives separate signals from the outputs of the secondary electron multipliers 13 and 14, respectively. The green signal from the secondary electron multiplier 13 is without a carrier frequency and each of the blue and red signals from the secondary electron multiplier 14 has superimposed thereon a carrier frequency determined by the gratings on the strips 7 and 9. The luminance and chrominance signals furnished by the control circuit 15 are transmitted to the receiver 12 for reproduction of color images on the screen **12*a***.

Though the system of FIG. 5 employs two secondary electron multipliers 13 and 14, their presence allows for a certain simplification of the control circuit 15 and insures a highly satisfactory reproducibility of signals.

Figure 6:
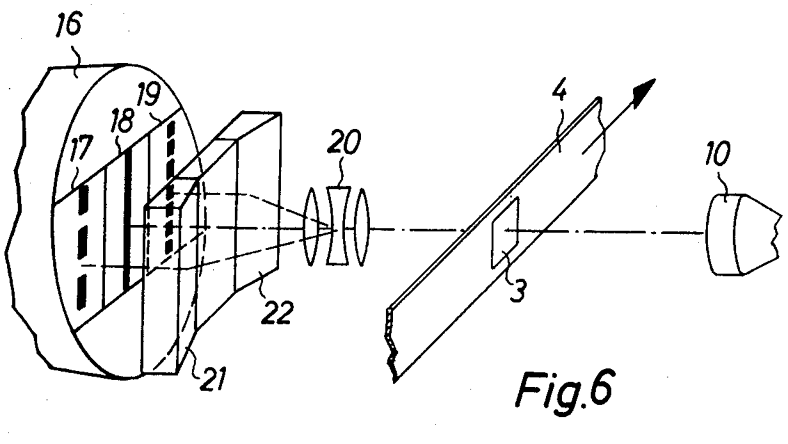
FIG. 6 is a fragmentary perspective view of still another system.

Referring finally to FIG. 6, there is shown a system whose operation is substantially the inverse of the principle of operation of the system shown in FIG. 1. This system employs a special scanning tube 16 which is an electrostatic tube and is therefore capable of performing a much more rapid scanning operation. The output screen of the electrostatic scanning tube 16 has three filter zones 17,18 and 19 in the additive primary colors. The middle or central zone 18 is imaged onto a film frame 3 by way of an objective lens system 20. Prisms 21 and 22 are respectively interposed between the lens system 20 and the filter zones 17,19 to insure that the zones 17,19 too, are imaged in the film frame 3 which is in registry with the lens system 20. The light issuing from the frame 3 impinges on a photoelectric transducer which is a functional equivalent of the transducer 10 shown in FIG. 1.

The scanning tube 16 is synchronized in such a way that it scans corresponding lines in the filter zones 17,18, 19 "quasi simultaneously," i.e., the electron beam is deflected in planes normal to the longitudinal direction of filter strips and the intensity of the light beam is regulated in such a way that, due to the very high horizontal speed, one point on the scanned line of each of the filter zones 17–19 is illuminated practically simultaneously with the corresponding points in the other filter zones. During the next-following pass, the neighboring points of the lines are brought to luminance, and so forth. The switching frequency of the scanning tube 16 from filter zone to filter zone is much higher than either of the color carrier frequencies.

The signal furnished by transducer 10 to circuit 11 is identical to the corresponding signal in FIG. 1.

The scanning tube 16 of FIG. 6 can be replaced with a scanning tube having three cathodes and three deflecting systems, one for each of the three filter zones. Such scanning tube insures substantially simultaneous scanning of the three filter zones.

It is presently preferred to replace the illustrated gratings with electronic means for impressing a carrier frequency on the beam or beams reaching the transducer means. This is advisable because such frequency is not dependent on the accuracy of gratings and/or the scanning speed.

While the invention has been illustrated and described as embodied in specific equipment for scanning motion picture film for reproduction on a television receiver, it is not intended to be limited to the details shown, since various modifications of structural and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What is claimed as new and desired to be protected by Letters Patent is set forth in the appended

1. System for reproduction of color images, comprising, in combination, receiver means furnishing a visual image in response to electrical signals; photoelectric transducing means furnishing said electrical signals in response to incident light impinging thereon; and incident light furnishing means furnishing said incident light to said photoelectric transducing means, said incident light furnishing means comprising scanning means scanning said images line-by-line along scanning lines and furnishing a modulated light beam as a result thereof; a plurality of filter strips each filtering a corresponding color, each having a lengthwise direction arranged in a direction corresponding to the direction of said scanning lines, each furnishing a filtered beam component in response to a light beam incident thereon; and carrier signal means for superimposing a first and second carrier signal having a first and second carrier frequency respectively, onto a first and second one of said filtered beam components.

2. A system as set forth in claim 1, wherein said receiver means comprise color television receiver means; and wherein said color images comprise frames of motion picture color film.

3. A system as set forth in claim 2, wherein said carrier signal means comprise first and second grating means on a first and second one of said filter strips, said grating means comprising grating lines extending in a direction perpendicular to said lengthwise direction of said filter strips.

4. A system as set forth in claim 3, wherein said scanning means comprise a point source of a substantially white light beam; and deflecting means moving said point source in said line-by-line scanning pattern relative to said color images.

5. A system as set forth in claim 4, wherein said plurality of filter strips comprises a first, second, and third filter strip mounted in front of said photoelectric transducing means in the direction of propagation of light incident thereto; further comprising first optical means for distributing light from said modulated beam over said first, second, and third filter strips.

6. A system as set forth in claim 5, wherein said first, second, and third filter strips respectively have the colors of red, green, and blue; and wherein said grating means comprise a plurality of first and second grating lines respectively imprinted upon said first and third filter strips, all of said grating lines extending in a direction perpendicular to said lengthwise direction of said filter strips, the distance between consecutive ones of said plurality of first grating lines differing from the distance between consecutive ones of said plurality of second grating lines.

7. A system as set forth in claim 6, wherein the frequency of said second grating lines is a non-integral multiple of the frequency of said first grating lines.

8. A system as set forth in claim 7, wherein said first optical means comprise an astigmatic objective, extending said modulated beam into an extended beam extending in a direction perpendicular to said lengthwise direction of said filter strips.

9. A system as set forth in claim 8, wherein said first optical means comprise a cylindrical lens.

10. A system as set forth in claim 9, wherein said first, second, and third filter strips comprise first, second and third filter strips of substantially equal width in a direction perpendicular to said lengthwise direction; wherein said first, second, and third filter strips are mounted side-by-side in such a manner that the combined width of said strips is substantially equal to the sum of the individual width of said strips; and wherein said extended beam extends at least over said combined width.

11. A system as set forth in claim 10, further comprising transport means transporting said motion picture color film in a direction perpendicular to said scanning lines; wherein said scanning pattern comprises a first, second, and third scan of each of said frames in said motion picture color film; and wherein said deflecting means deflect said point source a predetermined distance in the direction of motion of said film following completion of said first and second scans.

12. A system as set forth in claim 11, wherein said predetermined distance is a function of the height of said frames in the direction of movement of said film.

13. A system as set forth in claim 12, wherein said extended beam extends over a distance equal to said combined width increased by two times said predetermined distance.

14. A system as set forth in claim 12, wherein said plurality of filter strips comprises a plurality of sets of filter strips, each of said sets comprising said first, second, and third filter strips arranged in the same sequence; and wherein said extended beam extends over a distance equal to the width of one of said sets.

15. A system as set forth in claim 14, wherein all of said sets have the same width.

16. A system as set forth in claim 10, further comprising television signal furnishing means having frequency-dependent electrical filter means, for furnishing a luminance and chrominance signals in response to said electrical signal furnished by said photoelectric transducing means.

17. A system as set forth in claim 6, wherein said third filter strip is mounted between said first and second filter strips; and wherein said photoelectric transducing means comprise first photoelectric transducing means positioned to receive light from said first and third filter strips, and second photoelectric transducing means receiving light from said second filter strips; further comprising television signal furnishing means having inputs connected to the outputs of said first and second photoelectric transducing means and furnishing luminance and chrominance signals in dependence upon the signals furnished by said first and second photoelectric transducing means.

18. A system as set forth in claim 1, wherein said scanning means comprise a cathode ray beam means and a screen; wherein said plurality of filter strips is mounted on said screen; wherein said cathode ray tube comprises deflecting means deflecting said cathode ray beam means in such a manner that corresponding points on said screen associated with each of said filter strips are scanned substantially simultaneously thereby furnishing a first, second, and third filter beam component; wherein said scanning means further comprise second optical means combining said first, second, and third filter beam components into a scanning beam and focusing said scanning beam onto said color images; and wherein said photoelectric transducing means are mounted to receive said scanning beam after passage through said color images.

19. A system as set forth in claim 18, wherein said cathode ray beam means comprise a first, second, and third cathode ray beam; and wherein said carrier signal means comprise circuit means superimposing said first and second carrier signal on said first and second beam respectively.

20. A system as set forth in claim 18, wherein said carrier signal means comprise grating means on said first and second filter strips, said grating means comprising grating lines extending in a direction perpendicular to the lengthwise direction of said strips.

21. A system as set forth in claim 19, further comprising means individually controlling the intensity of said first, second, and third cathode ray beam means.

22. A system as set forth in claim 21, wherein said scanning means comprise first, second, and third deflecting means respectively deflecting said first, second, and third cathode ray beam means.

* * * * *